(12) United States Patent
Ramani et al.

(10) Patent No.: US 11,256,629 B2
(45) Date of Patent: *Feb. 22, 2022

(54) CACHE FILTERING

(71) Applicant: Apple Inc., Cupertino, CA (US)

(72) Inventors: Karthik Ramani, San Jose, CA (US); Fang Liu, Sunnyvale, CA (US); Steven Fishwick, Kings Langley (GB); Jonathan M. Redshaw, St Albans (GB)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/027,271

(22) Filed: Sep. 21, 2020

(65) Prior Publication Data
US 2021/0004331 A1   Jan. 7, 2021

Related U.S. Application Data

(63) Continuation of application No. 16/290,646, filed on Mar. 1, 2019, now Pat. No. 10,783,085.

(51) Int. Cl.
*G06F 12/08* (2016.01)
*G06F 12/0888* (2016.01)
*G06F 12/0815* (2016.01)
*G06F 12/0877* (2016.01)

(52) U.S. Cl.
CPC ...... *G06F 12/0888* (2013.01); *G06F 12/0815* (2013.01); *G06F 12/0877* (2013.01)

(58) Field of Classification Search
CPC ............. G06F 12/0815; G06F 12/0888; G06F 12/0877

USPC ......................................................... 711/145
See application file for complete search history.

(56) References Cited

U.S. PATENT DOCUMENTS

| 8,265,144 | B2 | 9/2012 | Christoffersen et al. |
| 10,095,543 | B1 | 10/2018 | Griffin et al. |
| 2014/0372700 | A1* | 12/2014 | Whalley ............. G06F 12/0802 711/122 |
| 2018/0336140 | A1 | 11/2018 | Guddekoppa et al. |
| 2019/0042450 | A1 | 2/2019 | Walker |

* cited by examiner

*Primary Examiner* — Hua J Song
(74) *Attorney, Agent, or Firm* — Kowert, Hood, Munyon, Rankin & Goetzel, P.C.

(57) ABSTRACT

Techniques are disclosed relating to filtering cache accesses. In some embodiments, a control unit is configured to, in response to a request to process a set of data, determine a size of a portion of the set of data to be handled using a cache. In some embodiments, the control unit is configured to determine filtering parameters indicative of a set of addresses corresponding to the determined size. In some embodiments, the control unit is configured to process one or more access requests for the set of data based on the determined filter parameters, including: using the cache to process one or more access requests having addresses in the set of addresses and bypassing the cache to access a backing memory directly, for access requests having addresses that are not in the set of addresses. The disclosed techniques may reduce average memory bandwidth or peak memory bandwidth.

20 Claims, 6 Drawing Sheets

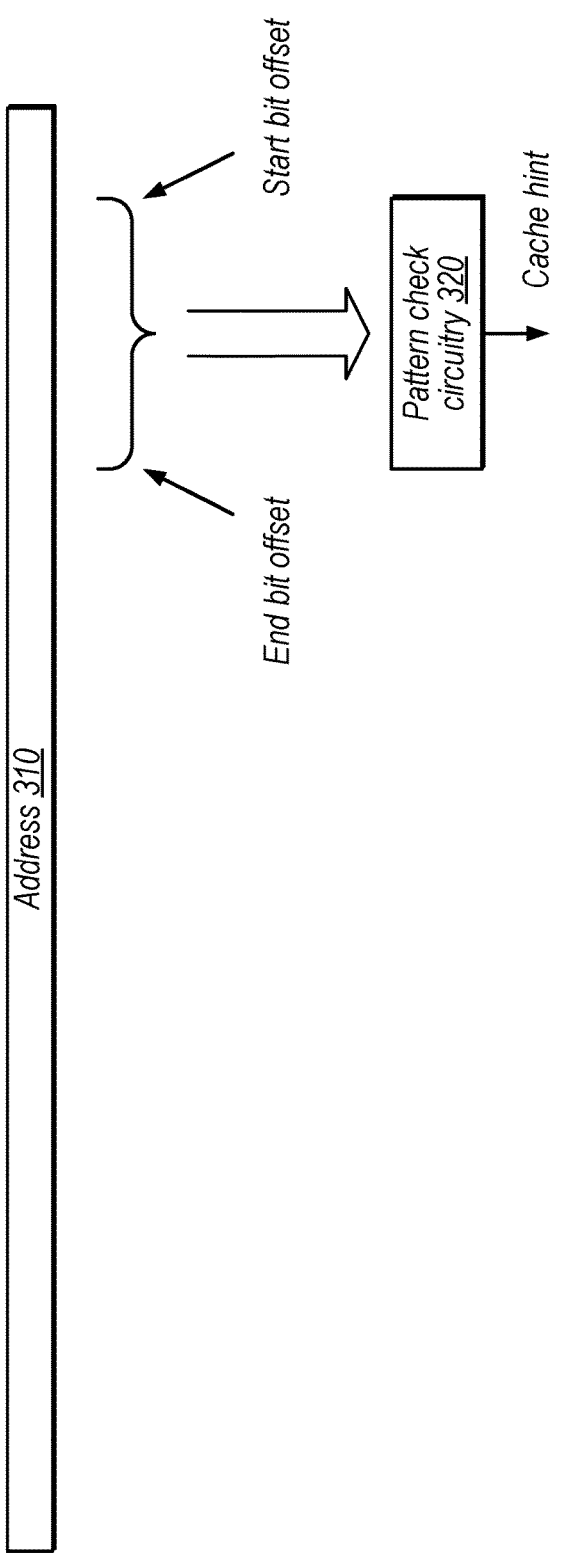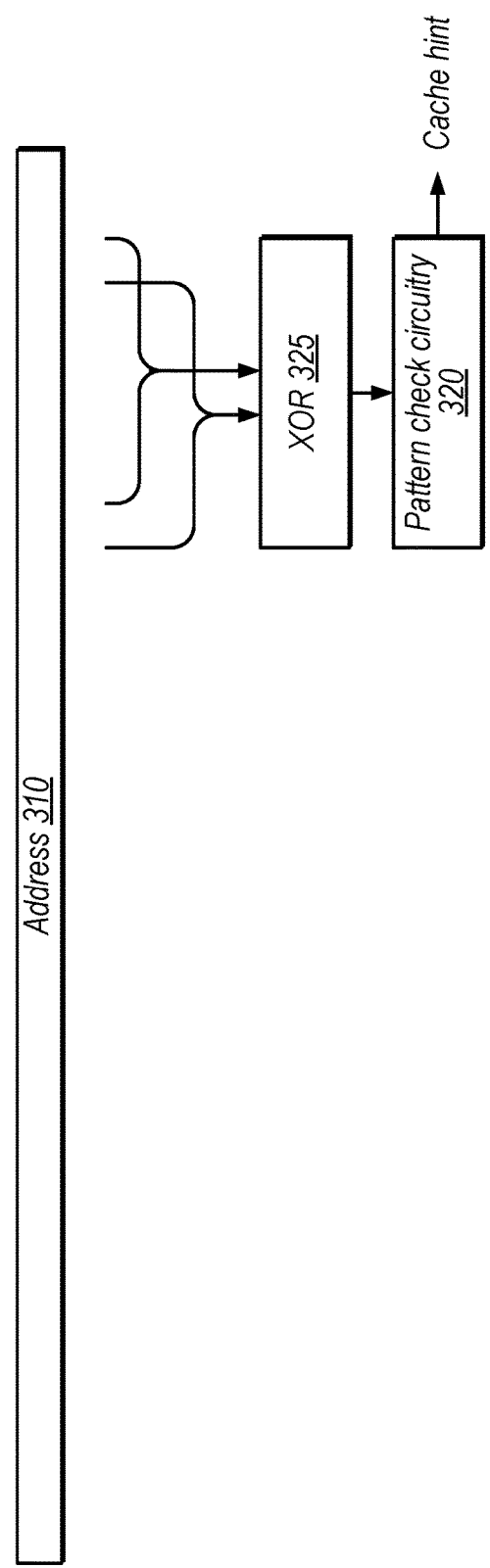
FIG. 3A
FIG. 3B

CACHE FILTERING

The present application is a continuation of U.S. application Ser. No. 16/290,646, filed Mar. 1, 2019, which is incorporated by reference herein in its entirety.

BACKGROUND

Technical Field

This disclosure relates generally to cache memory and more particularly to filtering that uses a cache for only a portion of a dataset.

Description of the Related Art

Caching is a well-known technique in which a cache memory is used to store data or instructions, e.g., for quicker access, relative to accesses to a backing memory. Thus, caches are typically used to store information that is likely to be used repeatedly and are typically smaller than backing memory space.

In some situations where a data set is larger than the size of the cache being used, cache thrashing may occur. Thrashing may be caused by an access pattern to main memory in which multiple locations compete for the same cache line, which may lead to cache misses and extensive traffic to the backing memory to store evicted data or retrieve data for cache misses. For example, in graphics processing units (GPUs), a cache may be used to capture pass-to-pass data re-use (e.g., write to read or multiple reads). Certain larger graphics surfaces may cause the pass-to-pass footprint to be larger than the capacity of the cache, which may result in thrashing.

BRIEF DESCRIPTION OF THE DRAWINGS

FIGS. 3A and 3B are diagrams illustrating example circuitry configured to determine whether to use or bypass the cache based on a portion of an address, according to some embodiments.

Figure 1:
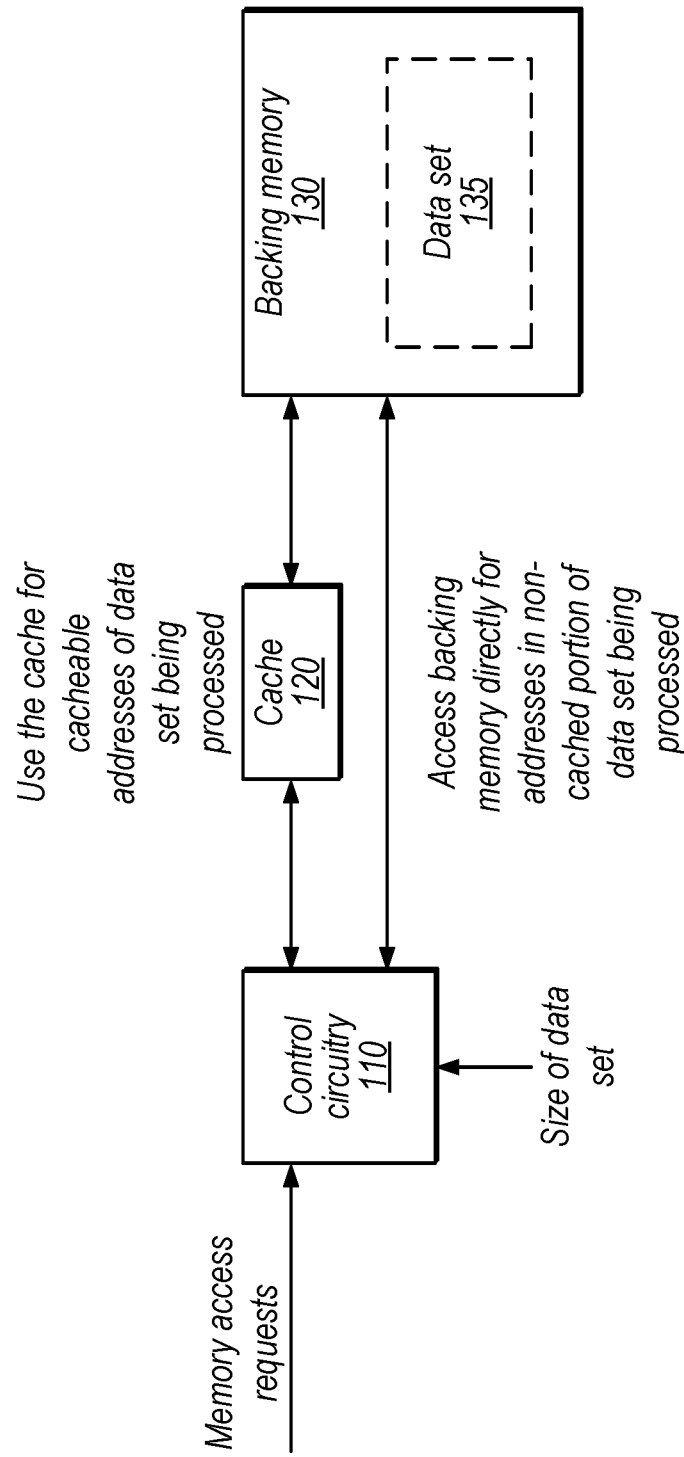
FIG. 1 is a block diagram illustrating example control circuitry configured to bypass a cache for a subset of access requests based on a size of a data set being processed, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "cache configured to store data" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

Further, as used herein, the terms "first," "second," "third," etc. do not necessarily imply an ordering (e.g., temporal) between elements. For example, a referring to a "first" graphics operation and a "second" graphics operation does not imply an ordering of the graphics operation, absent additional language constraining the temporal relationship between these operations. In short, references such as "first," "second," etc. are used as labels for ease of reference in the description and the appended claims.

DETAILED DESCRIPTION

Overview of Cache Filtering

In some embodiments, a device may determine that the size of a data set being processed is greater than can be stored in a cache used for processing the data set. For example, as discussed above, a cache may be used to capture pass-to-pass data re-use (e.g., write to read or multiple reads). Certain larger graphics surfaces may cause the pass-to-pass footprint to be larger than the capacity of the cache, which may result in thrashing.

In some embodiments, based on the size of the data set, the device is configured to cache only a subset of the data set and access a backing memory directly (bypassing the cache) for a remaining portion of the dataset. In some embodiments, the device generates information that indicates a set of addresses to be cached, while other addresses in the data set are accessed using the backing memory.

FIG. 1 is a block diagram illustrating example control circuitry configured to filter cache accesses, according to some embodiments. In the illustrated embodiment, a computing system includes control circuitry 110, cache 120, and backing memory 130 (which stores a data set 135).

Control circuitry 110, in the illustrated embodiment, is configured to receive memory access requests and information indicating a size of the data set 135. For addresses in a non-cached portion of the data set, control circuitry 110 bypasses cache 120 and accesses backing memory 130 directly. For cacheable addresses, control circuitry 110 uses cache 120 (note that this may involve accessing backing memory 130 in certain situations such as cache misses and evictions, as is well understood in the context of computer caches). Note that the entirety of the data set 135 may not actually be processed, but may indicate the size of the data set that could potentially be processed for use by control circuitry 110 to make cache filtering decisions.

One or more elements of FIG. 1 may be on the same processor or processor core. For example, cache 120 may be on the same processor core as control circuitry 110. In other embodiments, control circuitry 110 may be included in a processor core and cache 120 may be shared by multiple cores. Further, backing memory 130 may be part of a hierarchical memory structure itself and thus may not store all of data set 135, in some embodiments. For example, backing memory 130 may be another cache at a higher level than cache 120.

Cache 120 may be implemented using various appropriate memory technologies and caching topologies, including different sizes, different implementations or write through or write back techniques, various associativity configurations, various address translation implementations, various priority and control implementations, etc. In some embodiments, cache 120 is implemented using SRAM while backing memory 130 is implemented using DRAM.

In some embodiments, the subsets determined by control circuitry 110 may be used as hints, but may not completely control the accesses for which the cache is used. For example, other circuitry may determine to use (or refrain from using) the cache for certain accesses for other reasons and thus may override control signals from control circuitry 110.

Example Cached and Non-Cached Portions of a Data Set

Figure 2A:
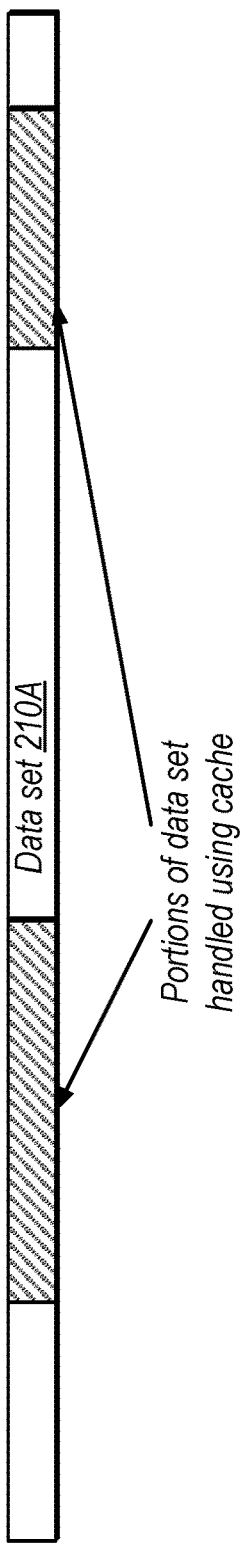
FIGS. 2A and 2B are diagrams illustrating example portions of a data set to be handled using a cache, according to some embodiments.

FIG. 2A is a diagram illustrating example portions of a data set 210A to be handled using the cache (while accesses to other portions may bypass the cache). In the example of FIG. 2A, a substantial number of consecutive data chunks are included in each of the portions of the data set to be handled using the cache. In other embodiments, the cacheable addresses may be separated, e.g., using a sieve pattern.

Figure 2B:
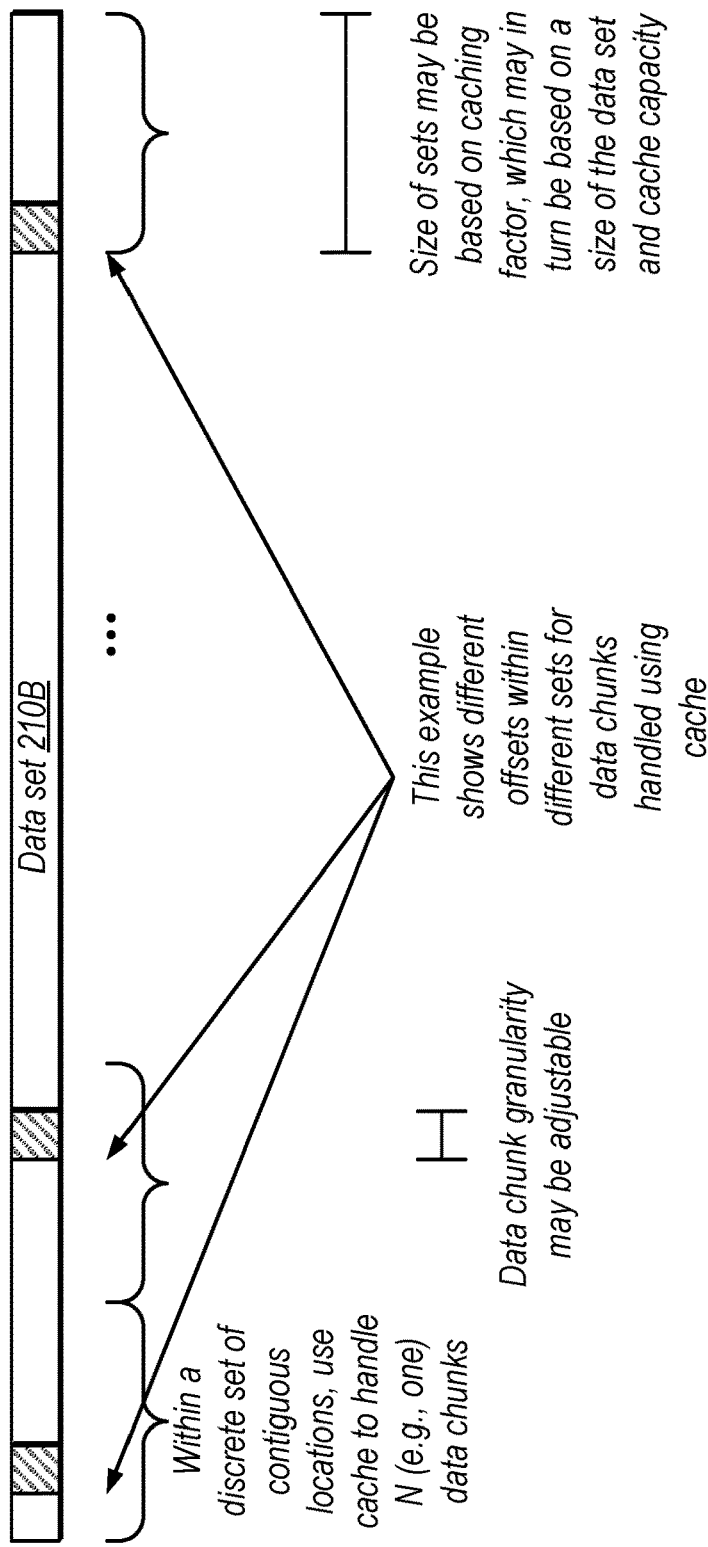

FIG. 2B is a diagram illustrating an example of sieve filtering, according to some embodiments. In the illustrated example, data set 210B includes multiple sets of data chunks (three sets are explicitly shown in FIG. 2B). In some embodiments, within a set, the cache is used to handle a certain number of data chunks (one data chunk per set in the illustrated example, although larger numbers of chunks per set are contemplated).

In the example of FIG. 2B, the offsets of cached data chunks within each set are different for different sets. This may reduce cache collision issues for certain stride patterns, for example. In other embodiments, cached data chunks within different sets may all have the same offsets.

In some embodiments, the granularity of the data chunks that are cached or bypassed is adjustable by control circuitry, software, or firmware executing on the device. Further, in some embodiments, the size of the sets may be based on a caching factor, which may be determined based on a size of the data set and available cache capacity for the data set, for example.

The examples of FIGS. 2A and 2B are included for purposes of illustration but are not intended to limit the scope of the present disclosure. In other embodiments, any of various filtering patterns may be implemented.

Example Circuitry for Determining how to Handle an Access Based on its Address

FIGS. 3A and 3B are diagrams illustrating example pattern check circuitry configured to dynamically determine whether to use or bypass a cache for a given access. In FIG. 3A, pattern check circuitry 320 is configured to generate a cache hint based on a portion of an address 310. In the illustrated embodiment, the portion of the address includes bits between a start bit offset and an end bit offset.

In some embodiments, the start bit offset is based on the filtering granularity while the end bit offset is determined based on the filtering granularity and the filtering factor. As one particular example, the end bit offset may be determined as: log 2(granularity)+log 2(factor)−1. In this example, the factor is a power of two and is greater than one. In other embodiments, similar techniques may be used with factors that are not powers of two. In some embodiments, the start bit offset is determined as: log 2(granularity).

In some embodiments, the factor is determined based on the size of the data set being processed and the available capacity in the cache for the data set. In some embodiments, the capacity is a fixed fraction of total cache capacity (potentially the entire capacity). In other embodiments, the capacity may be determined dynamically, e.g., based on tasks currently sharing the cache. The capacity may be allocated by firmware or a software kernel, for example. In some embodiments, the factor is determined as the size of the dataset divided by the available cache capacity. In some embodiments, the factor is rounded up to the nearest power of two. In some embodiments, the granularity is fixed. In other embodiments, the granularity may be adjusted, e.g., by software via one or more control registers. In some embodiments, the granularity is adjustable within a range, e.g., between 1 KB and 16 KB.

In some embodiments, the circuitry of FIG. 3A selects a chunk for caching within each of a plurality of sets of the data set, e.g., similar to FIG. 2B. For example, in some embodiments, pattern check circuitry includes one or more OR gates configured to indicate to use the cache for the access only if all the bits in the portion of the address are logical zeros. As another example, pattern check circuitry 320 may logically AND the portion of the address with a particular bit pattern. In various embodiments, pattern check circuitry 320 may check for any of various patterns.

FIG. 3B shows an example of pattern check circuitry that generates different offsets within different sets of contiguous locations within a data set, according to some embodiments. For example, this circuitry may be used to generate the different offsets within the sets shown in FIG. 2B. In the illustrated embodiment, a set of "offset bits" is generated with the same width as the address portion between the end bit offset and start bit offset, but starting at the end bit offset plus one. The two portions of the address are then XORed by XOR circuitry 325. In some embodiments, pattern check circuitry 320 indicates that the cache should be used when the output of XOR circuitry 325 is all zeros.

Note that FIGS. 3A and 3B provide examples of techniques for determining which data to filter, but are not intended to limit the scope of the present disclosure. In other embodiments, various different techniques may be used to determine which data to cache based on a filtering factor.

In some embodiments, the address bits used for filtering are selected to avoid interference with plane, bank, or set index hashing schemes used by the cache. In some embodiments, hashing may distribute cache lines effectively regardless of bit entropy. In some embodiments, this may avoid poor cache utilization and evictions.

In some embodiments, certain scenarios may interfere with cache efficiency, e.g., in tile-based graphics processors. As one example, static texture or geometry reads in a pass for a given tile may be generated while data from a previous pass for another tile are cached, which may potentially evict or thrash writes. In some embodiments, a separate cache partition and capacity quota may be implemented for such reads. As another example, writes from pass N+1 may evict data for tiles that have not yet been read from pass N. Because of tile-based processing, writes from tile A may replace previous pass writes for tile B, which have not yet been scheduled. In some embodiments, a separate ping-pong buffer may be used to store such evicted tiles. In other embodiments, less than an entirety of available capacity may be assigned for use by the first pass to reduce such evictions.

In some embodiments, filtering granularity is selected to reduce load imbalance on cache banks at a higher level and achieve desired memory utilization. In some embodiments, parameters such as filtering granularity, filtering factor, or capacity allocation may be adjusted by software (e.g., firmware, a driver, or a graphics program).

Example Method

Figure 4:
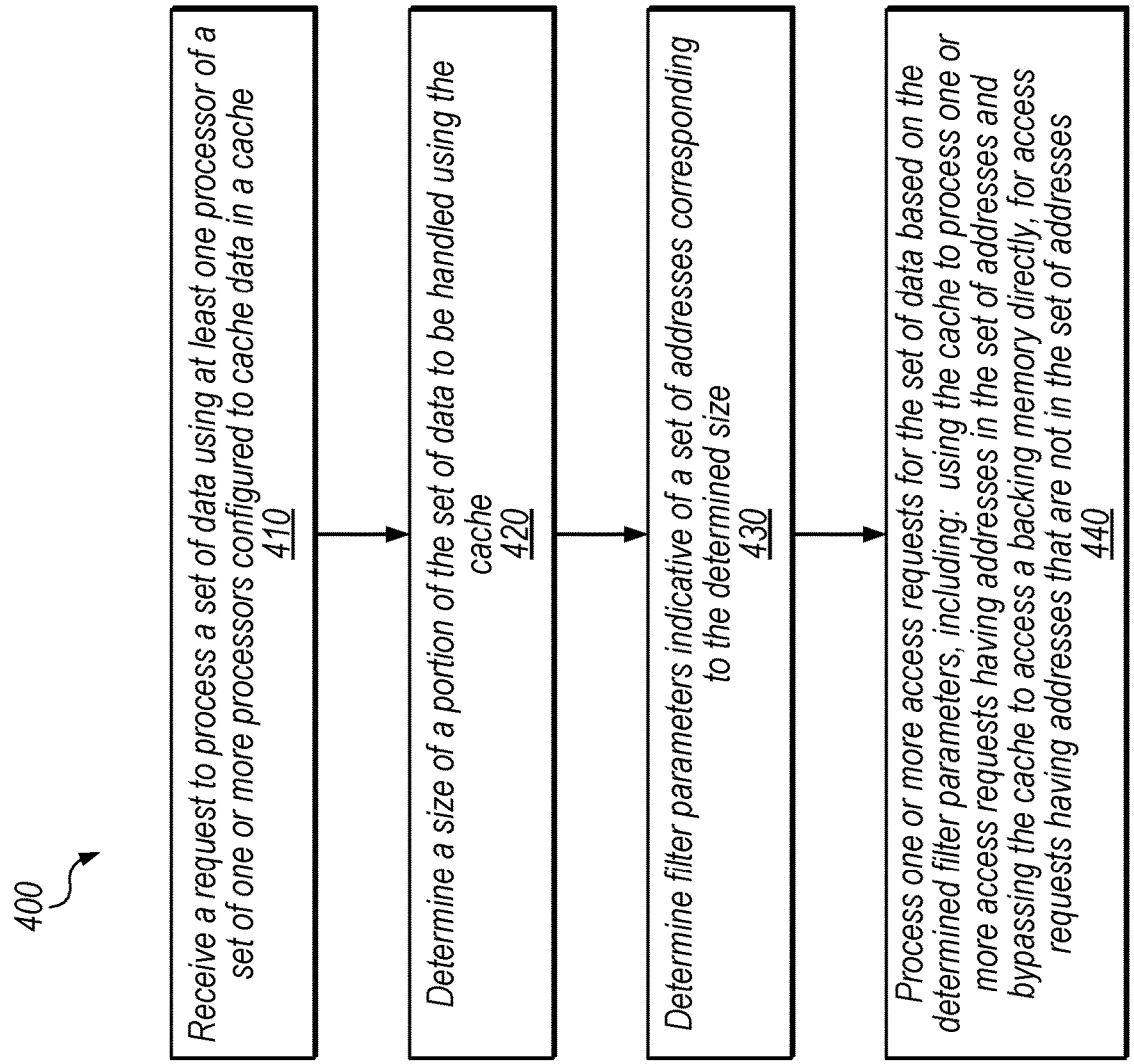
FIG. 4 is a flow diagram illustrating an example method for handling only a portion of a data set via a cache, according to some embodiments.

FIG. 4 is a flow diagram illustrating a method for handling only a portion of a data set with a cache, according to some embodiments. The method shown in FIG. 4 may be used in conjunction with any of the computer circuitry, systems, devices, elements, or components disclosed herein, among others. In various embodiments, some of the method elements shown may be performed concurrently, in a different order than shown, or may be omitted. Additional method elements may also be performed as desired.

At 410, in the illustrated embodiment, graphics processor circuitry receives a request to process a set of data using at least one processor of a set of one or more processors that are configured to cache data in a cache. For example, the processors may include one or more programmable shaders and the cache may be a surface cache. As other non-limiting examples, the disclosed techniques may be used for an internal cache of a CPU core, a cache that is shared among multiple cores, or a cache that is dedicated to caching a particular type of data. In some embodiments, the cache is dedicated to a single processor.

At 420, in the illustrated embodiment, the circuitry determines a size of a portion of the set of data that is to be handled using the cache. For example, for a filtering factor of four, one-fourth of the data may be handled using the cache. In some embodiments, for accesses in the set of data that are not handled using the cache, the circuitry accesses a backing storage element directly, bypassing the cache. For accesses in the set of data that are handled using the cache, various well-understood caching techniques may be utilized, such as checking for cache hits, writing back modified data, flushing, using a least-recently-used algorithm to perform evictions, etc.

At 430, in the illustrated embodiment, the circuitry determines filter parameters indicative of a set of addresses corresponding to the determined size. In some embodiments, these parameters directly specify the set of addresses to be handled using the cache. In other embodiments, the parameters are usable by the circuitry to determine (e.g., dynamically) addresses of data chunks to handle using the cache. For example, the parameters may indicate the filtering factor, granularity, and a circuit or algorithm for checking addresses for a pattern based on the factor and granularity (e.g., the circuitry of FIG. 3A or 3B). In some embodiments, the parameters may be hard-coded into the circuitry. In various embodiments, the parameters may be determined based on a size of the set of data to be cached and available capacity in the cache for the set of data.

At 440, in the illustrated embodiment, the circuitry processes one or more access requests for the set of data based on the determined filter parameters. In some embodiments, this includes using the cache to process one or more access requests having addresses in the set of addresses and bypassing the cache to access a backing memory directly, for access requests having addresses that are not in the set of addresses. (Note that the backing memory may be a random-access memory or some other type of storage element such as another cache, in various embodiments). In some embodiments, the disclosed techniques may reduce peak and average bandwidth to the backing memory for data sets that are larger than available cache capacity.

In some embodiments, the set of addresses includes, from each of a plurality of discrete sets that each include multiple contiguous locations in the set of data, a predetermined number of data chunks. For example, FIG. 2B shows multiple discrete sets that each include multiple contiguous locations and selection of one data chunk within each discrete set to handle using the cache. As shown in FIG. 2B, in some embodiments the set of addresses includes data chunks at different offsets within two or more of the discrete sets. In some embodiments, the circuitry is configured to adjust a size of the data chunks based on a granularity parameter. In some embodiments, the circuitry is configured to determine whether accesses fall within the set of addresses based on a set of bits of addresses of the accesses (e.g., the bit ranges that are pattern checked in FIGS. 3A-3B). In some embodiments, the circuitry is configured to determine which set of bits to use based on a granularity of data chunks to be handled using the cache and the size of the portion of the data set to be handled using the cache.

Example Device

Figure 5:
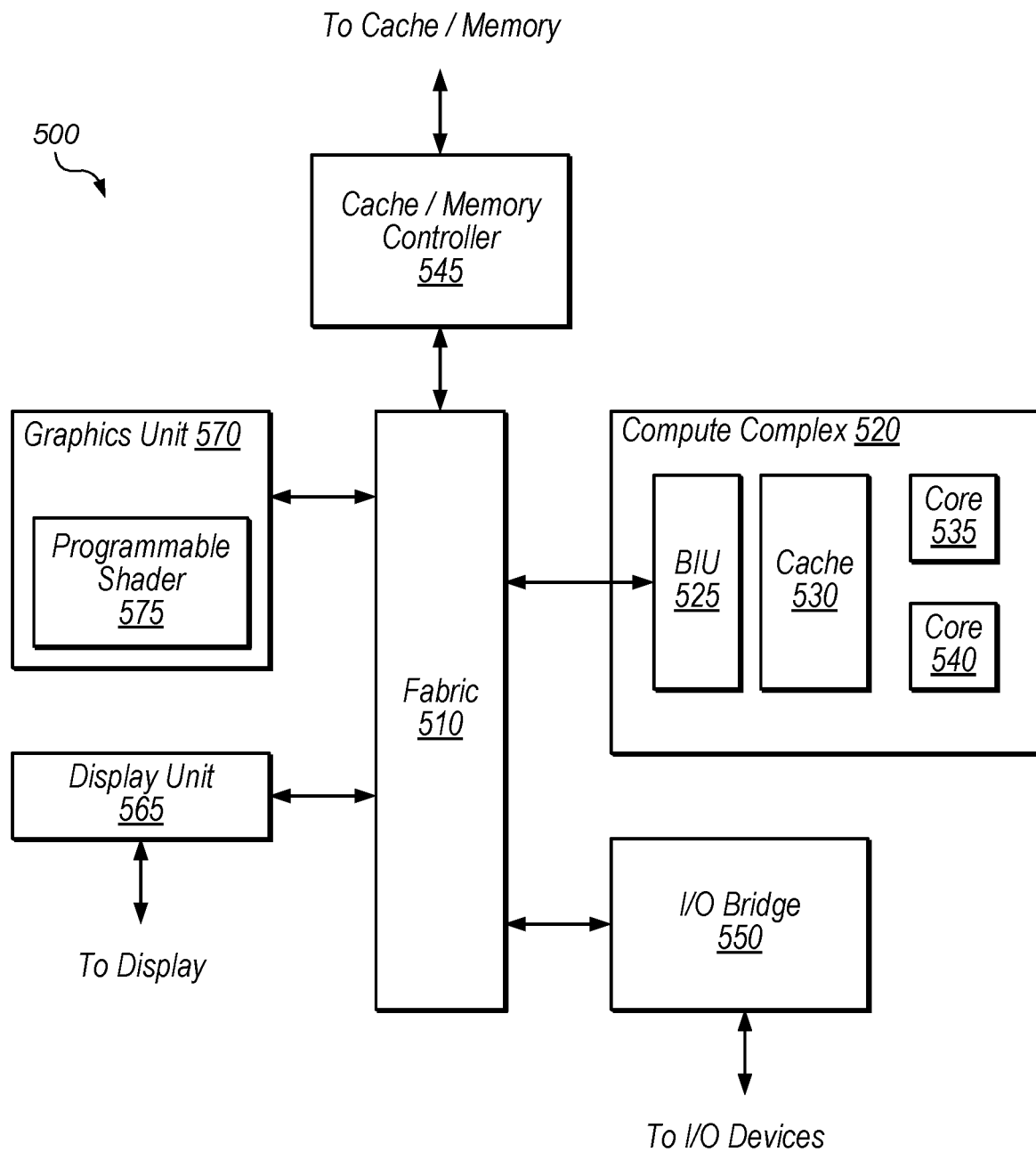
FIG. 5 is a block diagram illustrating an example computing device that includes one or more caches, according to some embodiments.

Referring now to FIG. 5, a block diagram illustrating an example embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520 input/output (I/O) bridge 550, cache/memory controller 545, graphics unit 570, and display unit 565. In some embodiments, device 500 may include other components (not shown) in addition to and/or in place of the illustrated components, such as video processor encoders and decoders, image processing or recognition elements, computer vision elements, etc.

The techniques disclosed herein may be utilized in various caches in various types of computing devices, such as the device shown in FIG. 5. For example, the disclosed techniques may be implemented for one or more caches in graphics unit 570, one or more caches in a cache memory hierarchy that is accessible via controller 545, or one or more processor caches such as cache 530 or internal cache(s) in cores 535 and 540.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of processors, processor cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 570 may be described as "coupled to" a memory through fabric 510 and cache/memory controller 545. In contrast, in the illustrated embodiment of FIG. 5, graphics unit 570 is "directly coupled" to fabric 510 because there are no intervening elements.

Graphics unit 570 may include one or more processors and/or one or more graphics processing units (GPU's). Graphics unit 570 may receive graphics-oriented instructions, such as OPENGL®, Metal, or DIRECT3D® instructions, for example. Graphics unit 570 may execute specialized GPU instructions or perform other operations based on the received graphics-oriented instructions. Graphics unit 570 may generally be configured to process large blocks of data in parallel and may build images in a frame buffer for output to a display. Graphics unit 570 may include transform, lighting, triangle, and/or rendering engines in one or more graphics processing pipelines. Graphics unit 570 may output pixel information for display images. Programmable shader 575, in various embodiments, may include highly parallel execution cores configured to execute graphics programs, which may include pixel tasks, vertex tasks, and compute tasks (which may or may not be graphics-related).

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Example Computer-Readable Medium

The present disclosure has described various example circuits in detail above. It is intended that the present disclosure cover not only embodiments that include such circuitry, but also a computer-readable storage medium that includes design information that specifies such circuitry. Accordingly, the present disclosure is intended to support claims that cover not only an apparatus that includes the disclosed circuitry, but also a storage medium that specifies the circuitry in a format that is recognized by a fabrication system configured to produce hardware (e.g., an integrated circuit) that includes the disclosed circuitry. Claims to such a storage medium are intended to cover, for example, an entity that produces a circuit design, but does not itself fabricate the design.

Figure 6:
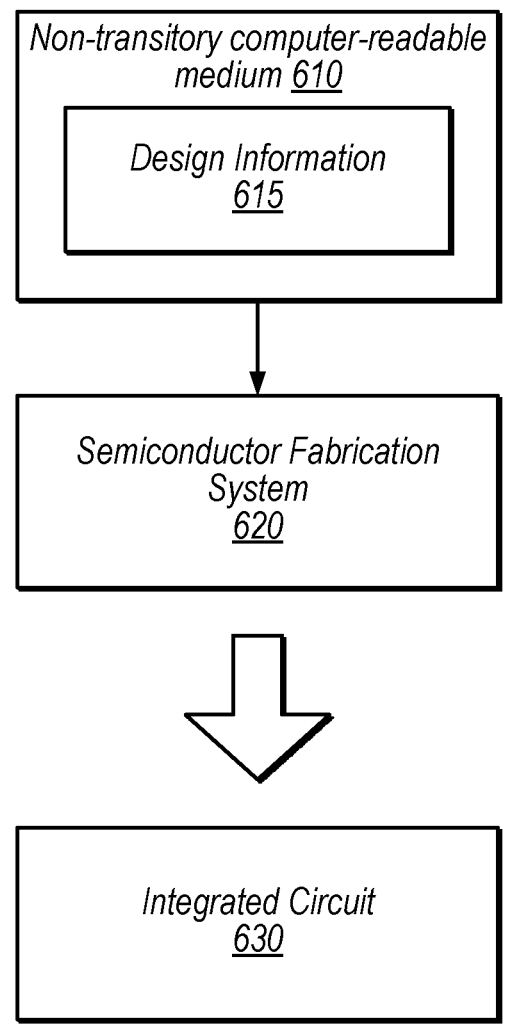
FIG. 6 is a block diagram illustrating an example computer-readable medium that stores circuit design information, according to some embodiments.

FIG. 6 is a block diagram illustrating an example non-transitory computer-readable storage medium that stores circuit design information, according to some embodiments. In the illustrated embodiment semiconductor fabrication system 620 is configured to process the design information 615 stored on non-transitory computer-readable medium 610 and fabricate integrated circuit 630 based on the design information 615.

Non-transitory computer-readable storage medium 610, may comprise any of various appropriate types of memory devices or storage devices. Non-transitory computer-readable storage medium 610 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Non-transitory computer-readable storage medium 610 may include other types of non-transitory memory as well or combinations thereof. Non-transitory computer-readable storage medium 610 may include two or more memory mediums which may reside in different locations, e.g., in different computer systems that are connected over a network.

Design information 615 may be specified using any of various appropriate computer languages, including hardware description languages such as, without limitation: VHDL, Verilog, SystemC, SystemVerilog, RHDL, M, MyHDL, etc. Design information 615 may be usable by semiconductor fabrication system 620 to fabricate at least a portion of integrated circuit 630. The format of design information 615 may be recognized by at least one semiconductor fabrication system 620. In some embodiments, design information 615 may also include one or more cell libraries which specify the synthesis and/or layout of integrated circuit 630. In some embodiments, the design information is specified in whole or in part in the form of a netlist that specifies cell library elements and their connectivity. Design information 615, taken alone, may or may not include sufficient information for fabrication of a corresponding integrated circuit. For example, design information 615 may specify the circuit elements to be fabricated but not their physical layout. In this case, design information 615 may need to be combined with layout information to actually fabricate the specified circuitry.

Integrated circuit 630 may, in various embodiments, include one or more custom macrocells, such as memories, analog or mixed-signal circuits, and the like. In such cases, design information 615 may include information related to included macrocells. Such information may include, without limitation, schematics capture database, mask design data, behavioral models, and device or transistor level netlists. As used herein, mask design data may be formatted according to graphic data system (GDSII), or any other suitable format.

Semiconductor fabrication system 620 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 620 may also be configured to perform various testing of fabricated circuits for correct operation.

In various embodiments, integrated circuit 630 is configured to operate according to a circuit design specified by design information 615, which may include performing any of the functionality described herein. For example, integrated circuit 630 may include any of various elements shown in FIG. 1 or 3A-3B, and/or 5. Further, integrated circuit 630 may be configured to perform various functions described herein in conjunction with other components. Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   cache circuitry;
   one or more graphics processors configured to cache graphics surface data in the cache circuitry;
   control circuitry configured to:
   determine a portion of the graphics surface to be handled using the cache circuitry;
   determine filter parameters corresponding to the portion, wherein the filter parameters are indicative of a set of addresses of data chunks to be processed using the cache circuitry, wherein addresses in the set of addresses are distributed across the graphics surface, based on the filter parameters, according to one or more threshold distances between addresses in the set; and
   process one or more access requests for the graphics surface based on the determined filter parameters, including to:
   use the cache circuitry to process one or more access requests having addresses in the set of addresses; and
   bypass the cache circuitry to access a backing memory directly for access requests having addresses that are not in the set of addresses.

2. The apparatus of claim 1, wherein the graphics surface is a texture.

3. The apparatus of claim 1, wherein the control circuitry is configured to determine the portion of the graphics surface to be handled using the cache circuitry in response to a determination that a size of the graphics surface is greater than a threshold size.

4. The apparatus of claim 1, wherein the one or more graphics processors include one or more programmable shader processors.

5. The apparatus of claim 1, wherein the control circuitry is configured to determine the portion of the graphics surface for a particular pass of a multi-pass rendering procedure, thereby leaving cache space for other passes of the multi-pass rendering procedure.

6. The apparatus of claim 1, further comprising:
   a ping-pong buffer configured to store data evicted from the cache circuitry for multiple different tiles being processed.

7. The apparatus of claim 1, wherein, for different pairs of consecutive addresses in the set of addresses, the distances between consecutive addresses are different.

8. The apparatus of claim 1, wherein the control circuitry is configured to adjust a size of the data chunks based on a granularity parameter.

9. The apparatus of claim 1, wherein the control circuitry is configured to determine the size of the portion of the graphics surface based on:
   a size of the graphics surface; and
   available capacity for the graphics surface in the cache circuitry.

10. The apparatus of claim 1, wherein the apparatus is a computing device that further includes:
    one or more central processing units; and
    a display.

11. A method, comprising:
    determining, by control circuitry of a graphics processor, a portion of a graphics surface to be handled using cache circuitry;
    determining, by the control circuitry, filter parameters indicative of a set of addresses corresponding to the portion, wherein the filter parameters specify that addresses in the set of addresses are distributed across the graphics surface, based on the filter parameters, according to one or more threshold distances between addresses of data chunks to be processed using the cache;

processing, by the control circuitry, one or more access requests for the graphics surface based on the determined filter parameters, including:

using the cache circuitry to process one or more access requests having addresses in the set of addresses; and bypassing the cache circuitry to access a backing memory directly for access requests having addresses that are not in the set of addresses.

12. The method of claim 11, further comprising:
determining the portion of the graphics surface to be handled using the cache circuitry in response to a determination that a size of the graphics surface is greater than a threshold size.

13. The method of claim 11, wherein the determining is for a particular pass of a multi-pass rendering procedure.

14. The method of claim 11, further comprising:
storing data evicted from the cache circuitry for multiple different tiles being processed in a ping-pong buffer.

15. The method of claim 11, further comprising:
adjusting a size of the data chunks based on a granularity parameter.

16. A non-transitory computer readable storage medium having stored thereon design information that specifies a design of at least a portion of a hardware integrated circuit in a format recognized by a semiconductor fabrication system that is configured to use the design information to produce the circuit according to the design, including:

cache circuitry;

one or more graphics processors configured to cache graphics surface data in the cache circuitry;

control circuitry configured to:

determine a portion of the graphics surface to be handled using the cache circuitry;

determine filter parameters indicative of a set of addresses corresponding to the portion, wherein the filter parameters specify that addresses in the set of addresses are distributed across the graphics surface, based on the filter parameters, according to one or more threshold distances between addresses of data chunks to be processed using the cache; and process one or more access requests for the graphics surface based on the determined filter parameters, including to:

use the cache circuitry to process one or more access requests having addresses in the set of addresses; and bypass the cache circuitry to access a backing memory directly for access requests having addresses that are not in the set of addresses.

17. The non-transitory computer readable storage medium of claim 16, wherein the control circuitry is configured to determine the portion of the graphics surface to be handled using the cache circuitry in response to a determination that a size of the graphics surface is greater than a threshold size.

18. The non-transitory computer readable storage medium of claim 16, wherein the one or more graphics processors include one or more programmable shader processors.

19. The non-transitory computer readable storage medium of claim 16, wherein the control circuitry is configured to determine the portion of the graphics surface for a particular pass of a multi-pass rendering procedure, thereby leaving cache space for other passes of the multi-pass rendering procedure.

20. The non-transitory computer readable storage medium of claim 16, wherein the circuit further comprises:
a ping-pong buffer configured to store data evicted from the cache circuitry for multiple different tiles being processed.

* * * * *